United States Patent
Bousquet et al.

(10) Patent No.: US 12,448,919 B2
(45) Date of Patent: Oct. 21, 2025

(54) AIRCRAFT ENGINE OIL DISTRIBUTION SYSTEM

(71) Applicant: PRATT & WHITNEY CANADA CORP., Longueuil (CA)

(72) Inventors: Michel Bousquet, Longueuil (CA);
Kevin Nguyen, Montréal (CA);
Christopher Gover, Longueuil (CA);
Jeremie Barberger, Montreal (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 18/207,252

(22) Filed: Jun. 8, 2023

(65) Prior Publication Data
US 2024/0410318 A1    Dec. 12, 2024

(51) Int. Cl.
| | |
|---|---|
| F02C 7/06 | (2006.01) |
| F16N 39/00 | (2006.01) |
| F16N 39/02 | (2006.01) |

(52) U.S. Cl.
CPC ............. *F02C 7/06* (2013.01); *F16N 39/002* (2013.01); *F16N 39/02* (2013.01); F05D 2260/98 (2013.01); F16N 2210/08 (2013.01)

(58) Field of Classification Search
CPC . F01D 25/20; F01D 25/18; F02C 7/06; F16N 39/002
See application file for complete search history.

(56) References Cited

U.S. PATENT DOCUMENTS

| | | | | |
|---|---|---|---|---|
| 810,844 A | * | 1/1906 | Crawford | F16N 39/02 184/104.1 |
| 2,450,960 A | * | 10/1948 | Heintz | F01P 11/08 184/104.1 |
| 2,944,966 A | * | 7/1960 | Eickmeyer | B01D 5/0036 159/13.4 |
| 6,446,755 B1 | * | 9/2002 | Varailhon | B64C 27/14 184/6.12 |
| 7,637,337 B2 | * | 12/2009 | Stranges | F01M 11/0004 180/69.1 |
| 8,292,116 B2 | * | 10/2012 | Saito | F01M 5/002 220/563 |
| 10,578,020 B2 | | 3/2020 | Kenworthy et al. | |
| 11,073,042 B2 | * | 7/2021 | Kempers | F01D 25/18 |
| 11,525,399 B1 | | 12/2022 | Smith | |
| 11,585,239 B2 | | 2/2023 | Gebhard | |

(Continued)

FOREIGN PATENT DOCUMENTS

| | | |
|---|---|---|
| DE | 112008001778 | 8/2010 |
| EP | 4372213 | 5/2024 |

*Primary Examiner* — Anna M Momper
*Assistant Examiner* — Mark K Buse
(74) *Attorney, Agent, or Firm* — NORTON ROSE FULBRIGHT CANADA LLP

(57) ABSTRACT

An aircraft engine oil distribution system includes a system container, an oil reservoir disposed in the system container, the oil reservoir having a plurality of fins protruding from an inner-surface of a wall of the oil reservoir and extending into the oil reservoir, and a heat exchanger disposed in the system container. The heat exchanger includes a cooling fluid passage defined at least between the one or more walls of the system container and the sidewall of the oil reservoir, a matrix disposed in the cooling fluid passage in heat transfer relationship with the plurality of fins of the oil reservoirs.

20 Claims, 6 Drawing Sheets

(56) References Cited

U.S. PATENT DOCUMENTS

| | | |
|---|---|---|
| 2019/0338705 A1 | 11/2019 | Reid |
| 2020/0271014 A1* | 8/2020 | Gebhard ............ F01M 11/0004 |
| 2020/0284165 A1 | 9/2020 | Kempers |
| 2020/0340621 A1* | 10/2020 | Watanabe .......... B01D 19/0047 |
| 2022/0153426 A1* | 5/2022 | Holley ................. F01K 25/103 |
| 2022/0333867 A1* | 10/2022 | Shoemake ............. B64D 37/16 |

* cited by examiner

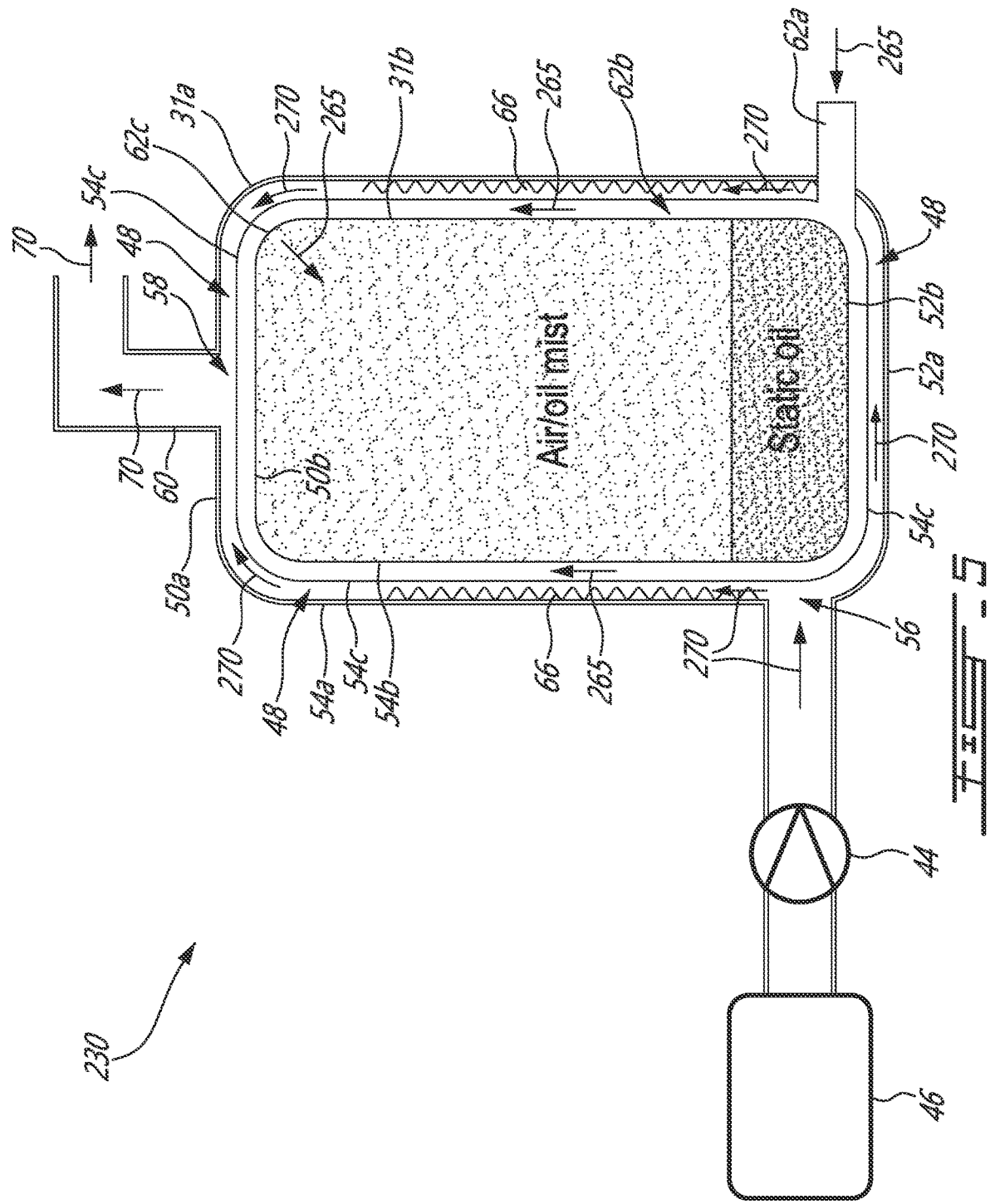

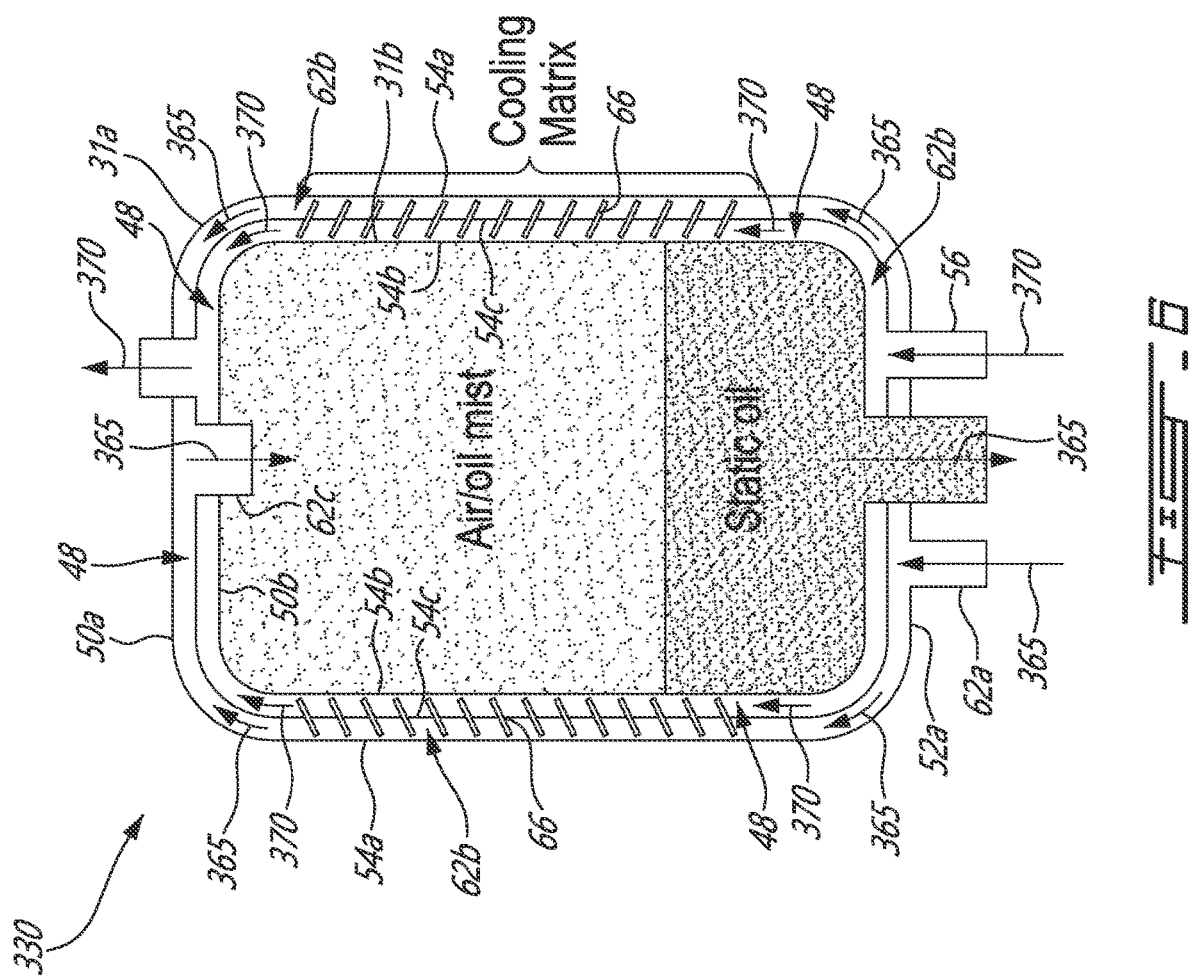

AIRCRAFT ENGINE OIL DISTRIBUTION SYSTEM

TECHNICAL FIELD

The disclosure relates generally to oil distribution systems and, more particularly, to oil distribution systems for an aircraft engine.

BACKGROUND OF THE ART

Almost every powerplant, whether an internal combustion engine, a gas turbine engine, etc., produces heat. Heat is produced whether through operation of the powerplant itself or from friction occurring between components of the powerplant. Oil accumulates heat as it flows through the oil system of the powerplant, and oil needs to be cooled before being recirculated in the oil system.

Existing heat exchangers may be suitable for their purpose of cooling the oil, but improvements are always desirable.

SUMMARY

In one aspect, there is provided an aircraft engine oil distribution system including a system container having one or more walls enclosing an internal volume, an oil reservoir disposed in the internal volume of the system container and defining an oil-receiving cavity therein for storing liquid oil and a mist of air and oil, the oil reservoir having a plurality of fins protruding from an inner surface of a wall of the oil reservoir and extending into the oil-receiving cavity, and a heat exchanger disposed in the internal volume of the system container. The heat exchanger includes a cooling fluid passage extending between a cooling fluid inlet and a cooling fluid outlet, the cooling fluid passage defined between the one or more walls of the system container and the wall of the oil reservoir and permitting flow of a cooling fluid therein, and a matrix disposed in the cooling fluid passage in heat transfer relationship with the plurality of fins of the oil reservoir.

In another aspect, there is provided an aircraft engine oil distribution system including a system container having one or more walls enclosing an internal volume, an oil reservoir disposed in the internal volume of the system container for storing liquid oil and a mist of air and oil, the oil reservoir having one or more walls, and a heat exchanger disposed in the internal volume of the system container. The heat exchanger includes an intermediate wall extending between the one or more walls of the oil reservoir and the one or more walls of the system container, an oil passage fluidly connected between an oil inlet and an oil outlet, the oil passage defined between one of the one or more walls of the system container and the one or more walls of the oil reservoir, and the intermediate wall, a cooling fluid passage fluidly connected between a cooling fluid inlet and a cooling fluid outlet, the cooling fluid passage defined between another one of the one or more walls of the system container and the one or more walls of the oil reservoir, and the intermediate wall, and a matrix disposed in the cooling fluid passage in heat transfer relationship with the intermediate wall.

DESCRIPTION OF THE DRAWINGS

Reference is now made to the accompanying figures in which:

FIG. 5 is a schematic cross-sectional view of another implementation of the system container of the oil distribution system of FIG. 2; and FIG. 6 is a schematic cross-sectional view of yet another implementation of the system container of the oil distribution system of FIG. 2.

DETAILED DESCRIPTION

Figure 1:
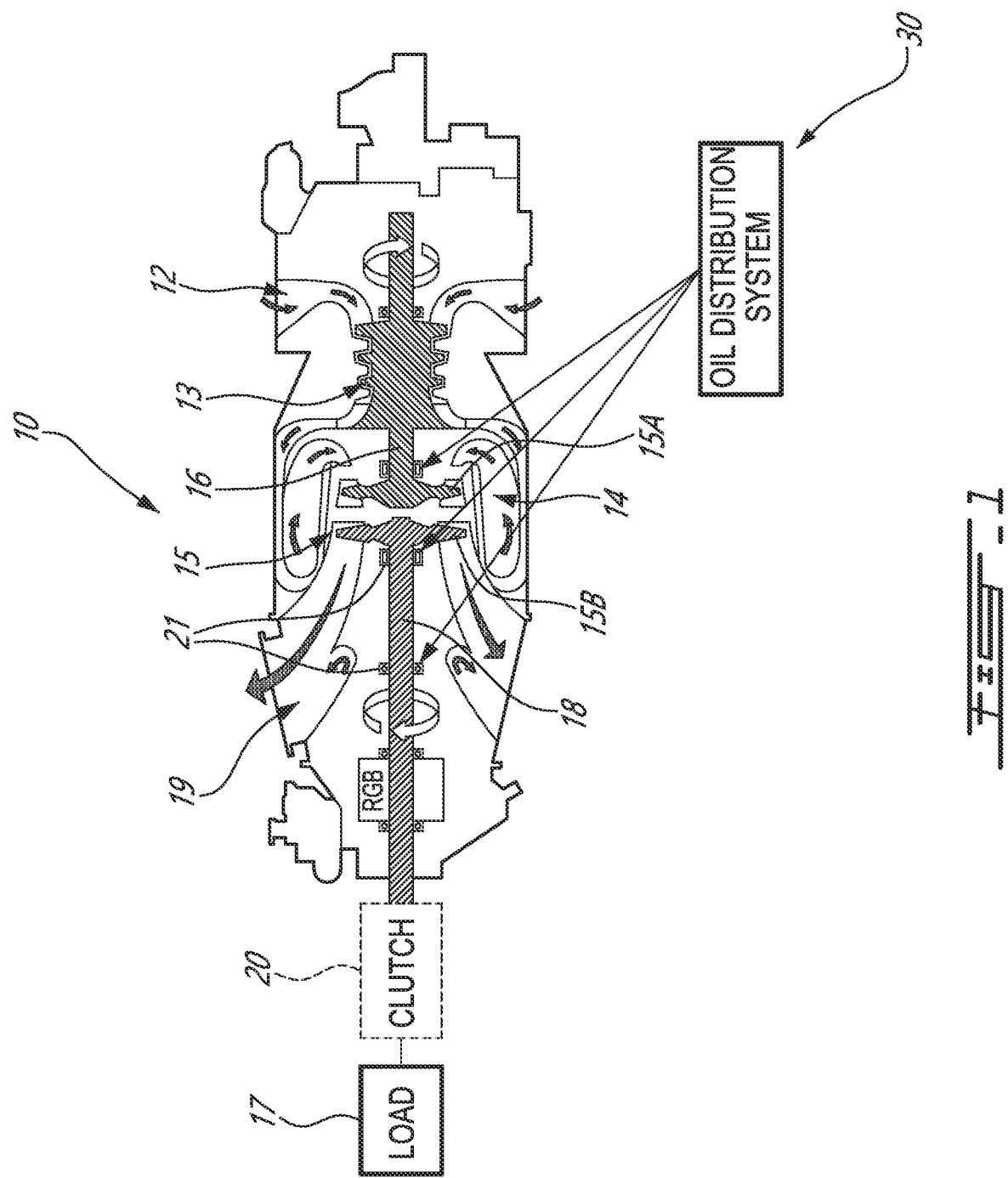
FIG. 1 is a schematic cross-sectional view of an aircraft engine depicted as a gas turbine engine.

FIG. 1 illustrates an aircraft engine depicted as a gas turbine engine 10 of a type preferably provided for use in subsonic flight, generally comprising in serial flow communication an inlet 12 for receiving air, a compressor section 13 for compressing the air received via the inlet 12, a combustor 14 for mixing fuel with the compressed air and for generating an annular stream of combustion gases. A turbine section 15 receiving the combustion gases from the combustor 14. The turbine section 15 has a high-pressure turbine 15A drivingly engaged to the compressor section 13 via a high-pressure shaft 16. The turbine section 15 further has a power or low-pressure turbine 15B downstream of the high-pressure turbine 15A and drivingly engaged to a load 17, which may be a propeller, a helicopter rotor, and so on, via a low-pressure shaft 18. The low-pressure shaft 18 may be directly engaged to the load or, as shown herein, drivingly engaged to the load 17 via a reduction gearbox RGB. The gas turbine engine 10 has an exhaust 19 for expelling the combustion gases. Although the depicted gas turbine engine 10 is a turboprop or turboshaft engine, the present disclosure may apply to other engines, such as auxiliary power units (APU), turbofans, internal combustion engines or fuel cell units. In an alternate embodiment, the compressor section may include a high-pressure compressor drivingly engaged to the high-pressure turbine 15A via the high-pressure shaft 16 and a low-pressure compressor drivingly engaged to the low-pressure turbine 15B via the low-pressure shaft 18. In the embodiment shown, the load 17 is drivingly engaged to the low-pressure shaft 18 via a clutch 20 that has engaged and disengaged configurations to selectively disengage the load 17 from the low-pressure shaft 18. In the case of a turboshaft application, this clutch 20 may allow the disengagement of a helicopter rotor from the low-pressure shaft 18. In some applications, such as a turboprop, the clutch 20 may be omitted.

The low-pressure shaft 18 and the high-pressure shaft 16 are rollingly supported by bearings 21. Typically, the bearings 21 are contained within bearing cavities 22 (FIG. 2) that may be hydraulically connected to an oil source to receive oil for lubrication. An oil distribution system 30 is provided for circulating oil to the bearings 26 and back to an oil reservoir 31b. The oil flowing through the oil distribution system 30 is expected to see its temperature increase during use. It may therefore be required to cool down the oil.

Figure 2:
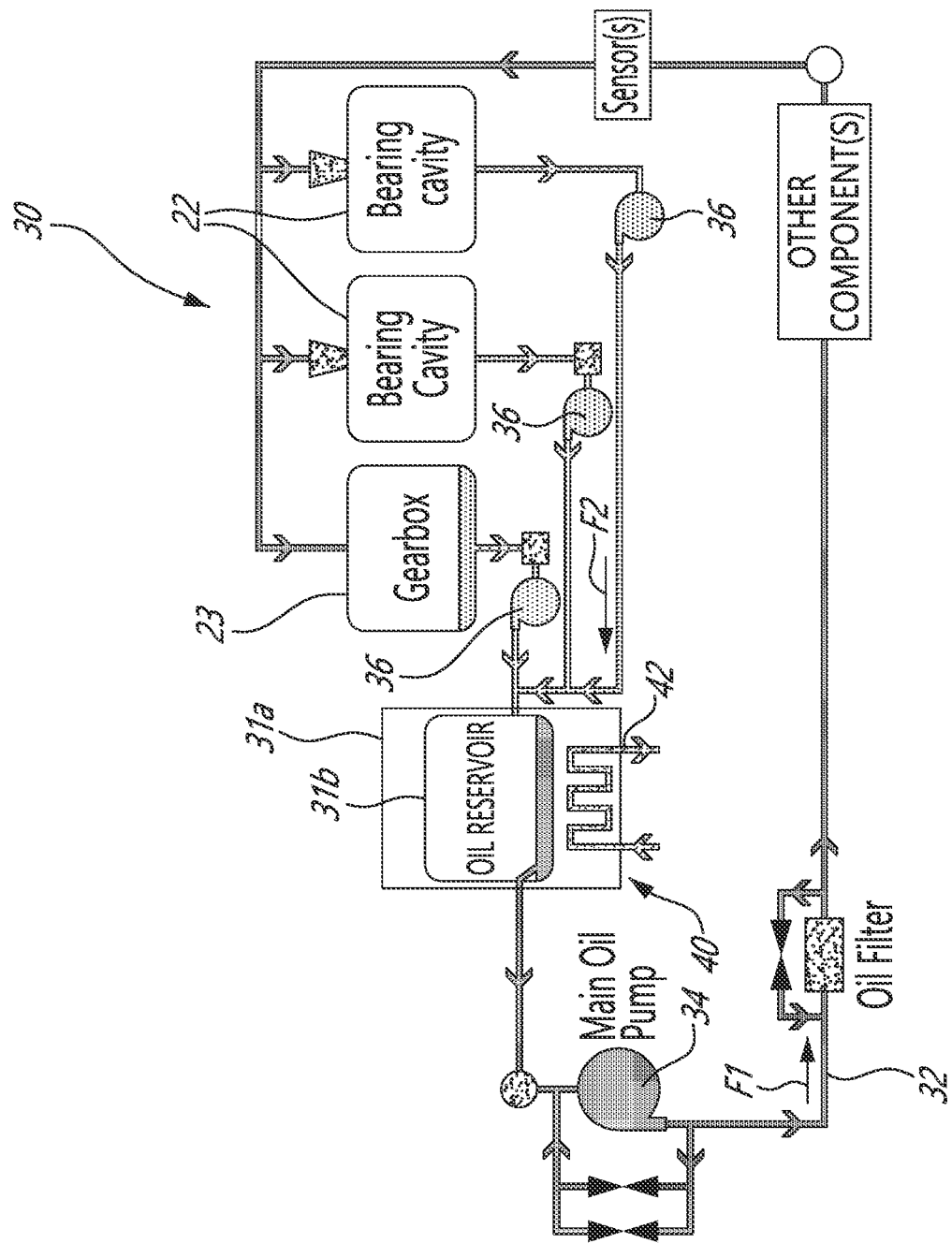
FIG. 2 is a schematic view of an implementation of an oil distribution system for the aircraft engine of FIG. 1.

Referring to FIG. 2, the oil distribution system 30 is shown in greater detail. Although depicted here in as part of the gas turbine engine 10 of FIG. 1, the oil distribution system 30 could be used in different powerplants, and more particularly in different thermal engines, such as, and not limited to, internal combustion engine and fuel cell units. The oil distribution system 30 includes a system container 31a, an oil circuit 32, which typically includes one or more lines to flow the oil, an oil pump 34 that drives an oil flow F1 within an oil conduit of the oil circuit 32 from the oil reservoir 31b. The oil distribution system 30 may be a pressure regulated system in which a pressure regulating valve may be connected in parallel to the oil pump 34. The oil exchanges heat at heat exchanger 40 with a cooling fluid 42 (at F2). The oil flow is then distributed between different components in need of oil. These components may include, for instance, one or more bearing cavity(ies) 22, a generator, an actuator, and/or a gearbox 23, which may correspond to the reduction gearbox of FIG. 1 or any other gearbox of the engine, in some embodiments. Used oil is then scavenged and scavenge pumps 36 drive a scavenge oil flow F2 from scavenge outlets of the bearing cavities 22 and the gearbox 23 back to the oil reservoir 31b where the oil may be flown back to the oil pump 34. Typically, the oil reservoir 31b has a volume devoid of oil (e.g. empty space containing a mist of air and oil). During lubrication, the oil is expected to be mixed with air. Thus, the scavenge oil flow F2 is a multi-phase fluid containing oil and air. The oil may rest some time in the oil tank before being drawn by the pump 34. During this time, the air contained in the oil may naturally separate. A de-oiler and/or de-aerator, such as deaerator 38 about to be described with reference to FIG. 4, may be used to accelerate the removal of air from the scavenge oil flow F2. It will be appreciated that many other configurations of the oil distribution system 30 are contemplated. For instance, a different number of scavenge pumps may be used, some components may be omitted, and so on. An actuator may be fluidly connected to the oil conduit and may rely on oil pressure for its operation.

Figure 3:
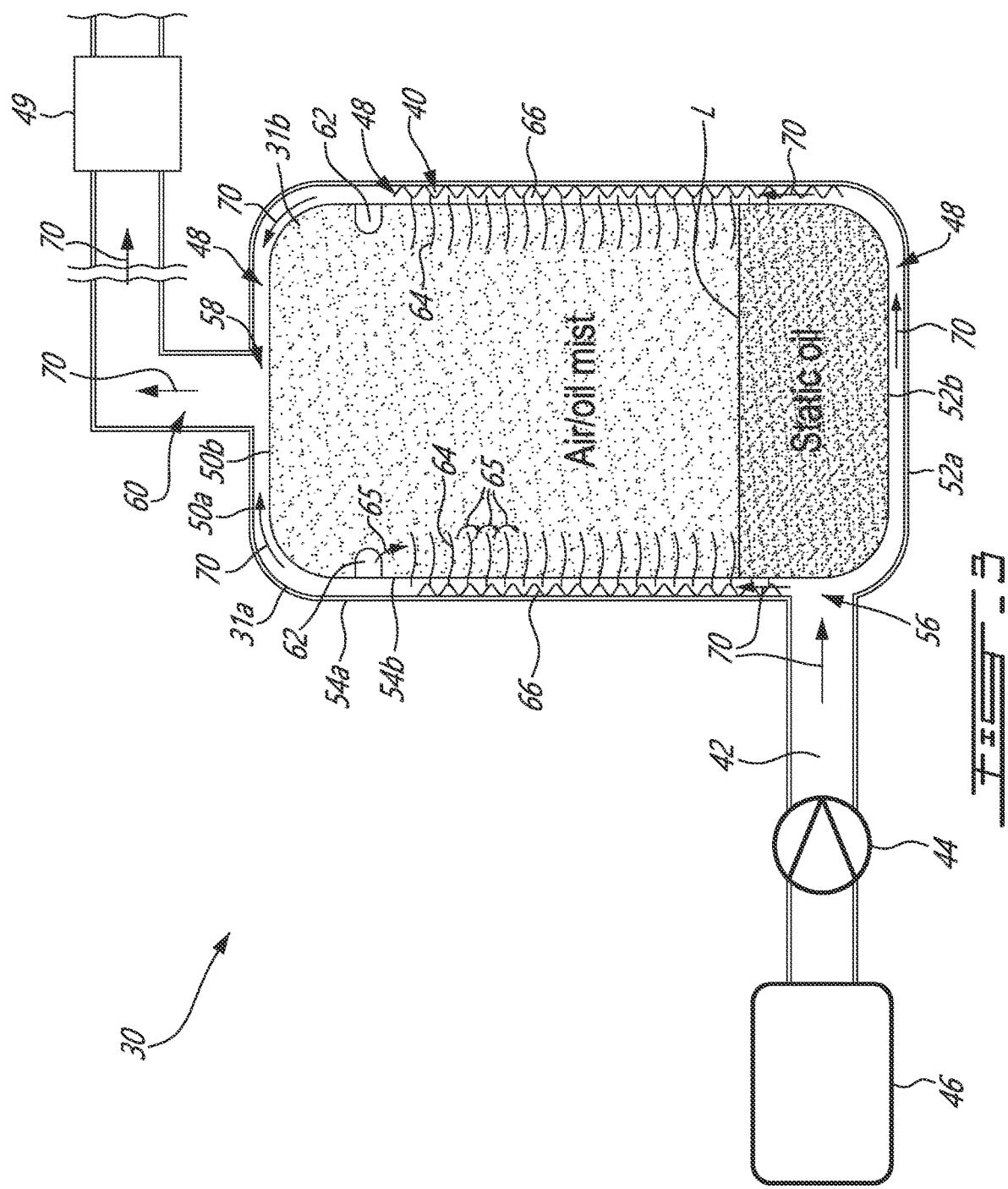
FIG. 3 is a schematic cross-sectional view of a system container of the oil distribution system of FIG. 2.

Turning now to FIG. 3, a portion of the oil distribution system 30 is schematically shown, and includes the system container 31a, the oil reservoir 31b and the heat exchanger 40. The system container 31a has, when positioned for use, a top wall 50a, a bottom wall 52a and a sidewall 54a. In embodiments where the system container 31a is not cylindrical, the system container 31a has a plurality of sidewalls 54a. The top wall 50a, the bottom wall 52a and the sidewall 54a enclose an internal volume of the system container 31a.

The heat exchanger 40 is disposed in the internal volume of the system container 31a. The heat exchanger 40 has a cooling fluid inlet 56 defined in the sidewall 54a to receive relatively cool cooling fluid 42 into the system container 31a. The cooling fluid inlet 56 is located closer to the bottom wall 52a than the top wall 50a. The cooling fluid inlet 56 is also located below a minimum level L of liquid oil in the oil reservoir 31b for operation of the oil distribution system 30. The cooling fluid inlet 56 could be located above the minimum level L of liquid oil in other implementations, so as to reduce cooling of liquid oil in the oil reservoir 31b as the cooling fluid 42 flows.

The cooling fluid 42 is drawn by a pump 44 from a cooling fluid reservoir 46, and flows in a cooling fluid passage 48 of the heat exchanger 40. The cooling fluid 42 is selected from the group including liquid ammonia, liquid methane, liquid propane, liquid butane, supercritical carbon dioxide, and liquid hydrogen. Such non-traditional cooling fluids 42 are adapted for use in a turboexpander 49 that is part of the aircraft engine 10 and schematically shown in FIG. 3. The non-traditional cooling fluids 42 have a relatively higher thermal capacity compared to other cooling fluids, such as gasoline, jet fuel, water or ethylene glycol. It is contemplated that other cooling fluids than the ones listed above could be used in the oil distribution system 30. A cooling fluid manifold 58 is connected to the top wall 50a of the system container 31a and is fluidly connected to a cooling fluid outlet 60 of the heat exchanger 40. The cooling fluid manifold 58 and the cooling fluid outlet 60 collect the cooling fluid 42 that has been warmed during its flow through the heat exchanger 40 and allow the warmed cooling fluid 42 to exit the system container 31a.

The oil reservoir 31b is disposed in the system container 31a and defines an oil-receiving cavity therein adapted for storing liquid oil and a mist of air and oil. The oil reservoir 31b has, when positioned for use, a top wall 50b, a bottom wall 52b and a sidewall 54b. In embodiments where the oil reservoir 31b is not cylindrical, the oil reservoir 31b has a plurality of sidewalls 54b. The cooling fluid passage 48 is defined between the top walls 50a, 50b, between the bottom walls 52a, 52b, and the sidewalls 54a, 54b. Put differently, when the cooling fluid 42 flows in the cooling fluid passage 48, the cooling fluid 42 surrounds the oil reservoir 31b. The cooling fluid 42 surrounding the oil reservoir 31b increases the surface area for heat transfer between the oil present in the oil reservoir 31b and the cooling fluid 42 flowing in the cooling fluid passage 48. An oil manifold 62 is defined in the sidewall 54b and allows the hot oil flowing from F2 to enter the oil reservoir 31b. The oil manifold 62 is located closer to the top wall 50b of the oil reservoir 31b than the bottom wall 52b of the oil reservoir 31b. The oil manifold 62 allows hot oil to flow downwardly into the oil reservoir 31b. A plurality of fins 64 protrude from an inner surface of the sidewall 54b and extend inwardly into the oil-receiving cavity of the oil reservoir 31b. Each fin 64 of the plurality of fins 64 is scooped-shaped and configured for permitting the oil from dripping from an upper fin to a lower fin (i.e. located below the upper fin). Put differently, as the hot oil enters the oil reservoir 31b via the oil manifold 62, the hot oil flows on the plurality of fins 64 in a cascading motion, downwardly over the plurality of fins 64 until reaching the level L of liquid oil in the oil reservoir 31b, as depicted by arrows 65 in FIG. 3. Having the oil dripping from upper to lower fins increases the travel time of the hot oil between the oil manifold 62 and the bottom of the oil reservoir 31b, which may increase the amount of heat transferred from the oil to the cooling fluid 42. The plurality of fins 64 could be shaped otherwise in other implementations, and could be flat for instance. The plurality of fins 64 could also extend from an inner-surface of the top wall 50b and/or of the bottom wall 52b.

The heat exchanger 40 further includes a matrix 66 disposed in the cooling fluid passage 48. The matrix 66 is located between the sidewalls 54a, 54b. The matrix 66 is connected to the sidewalls 54a, 54b, and to the plurality of fins 64. In other implementations, the matrix 66 is connected to at least one of the sidewall 54a, sidewall 54b, and the plurality of fins 64. Regardless of how the matrix 66 is connected to at least one of the sidewall 54a, sidewall 54b, and the plurality of fins 64, the matrix 66 is in a heat transfer relationship with the plurality of fins 64, whether via conductive heat transfer, convective heat transfer, radiation heat transfer or a combination thereof. In some implementation, the system container 31a, the oil reservoir 31b and the matrix 66 are integrally formed by, for example, additive manufacturing techniques. Having the plurality of fins 64 connected to the matrix 66 of the heat exchanger 40 permit transfer of heat from the oil dripping from one fin 64 to another to the matrix 66 by thermal conduction. The matrix 66 can have different shapes and topologies in different implementations. The matrix 66 is shaped and configured to optimize heat transfer between the hot oil flowing on the sidewall 54*b* and the fins 64 and the cooling fluid 42 flowing in the cooling fluid passage 48. The matrix 66 includes one or a combination of structures such as microchannels, a lattice structure, and gyroid structures, each having relatively high surface area per volume of the matrix 66, hence increasing heat transfer capabilities of the heat exchanger 40. The matrix 66 is schematically represented in the Figures, and may differ in scale/shape in different embodiments. As depicted by arrows 70 in FIG. 3, the cooling fluid 42 flows in a direction opposite the flow of oil in the oil reservoir 31*b*, that is upwardly from the cooling fluid inlet 56, through the cooling fluid passage 48 and the matrix 66, and on to the cooling fluid manifold 58 and the cooling fluid outlet 60. The cooling fluid 42 and oil are thus flowing in opposite directions in the oil distribution system 30, which may further increase the heat transfer therebetween.

In operation, hot oil flowing from the oil manifold 62 enters the oil reservoir 31*b* and drips from an upper fin 64 to a lower fin 64 (as depicted by arrows 65) and along the sidewall 54*b* of the oil reservoir 31*b* until reaching the liquid oil at the bottom of the oil reservoir 31*b*. As the oil flows downwardly, the oil is cooled upon contacting the fins 64 and the sidewall 54*b* being cooled by the cooling fluid 42 pumped by pump 44 and flowing upwardly in the cooling fluid passage 48 and through the matrix 66. The cooling fluid 42 flows between the bottom walls 52*a*, 52*b* and also cools the liquid oil present at the bottom of the oil reservoir 31*b*. The warmed cooling fluid 42 flows upwardly between the cooling fluid inlet 56 and the cooling fluid outlet 60, as depicted by arrows 70.

Having the oil cooled while being stored in the oil reservoir 31*b* may eliminate the need for a separate heat exchanger located remotely from the oil reservoir 31*b*, for example an air-cooled oil cooler (ACOC), which may reduce the bulk and weight of the oil distribution system 30 compared to other oil distribution systems. In addition, the use of a cooling fluid 42 with relatively high thermal capacity such as the ones described above may provide for adequate heat transfer while using a reduced volume of cooling fluid compared to other cooling fluids, such as water, fuel or ethylene glycol. This may in turn reduce the bulk and weight of the oil distribution system 30 while offering similar or better heat transfer.

Figure 4:
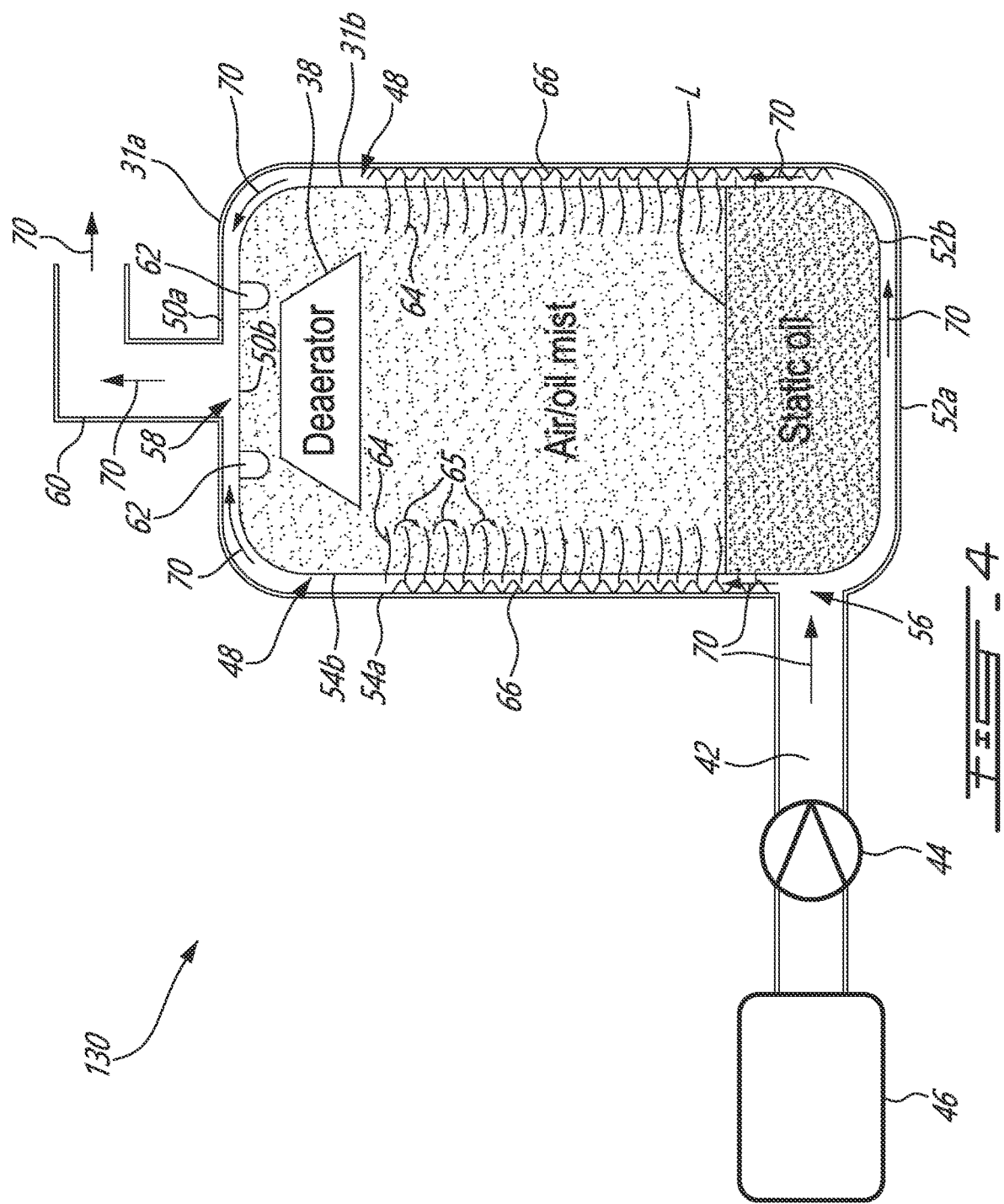
FIG. 4 is a schematic cross-sectional view of the system container of the oil distribution system of FIG. 3, with a deaerator located in an oil reservoir.

Turning now to FIG. 4, an oil distribution system 130 is shown. For simplicity, the oil distribution system 30*a* has same or similar features and structures as the oil distribution system 30, and these features and structures are identified with the same reference numeral, for simplicity. The oil distribution system 130 further includes the deaerator 38 located in an upper portion of the oil reservoir 31*b*. Put differently, the deaerator is located closer to the top wall 50*b* of the oil reservoir 31*b* than the bottom wall 52*b*. The deaerator 38 separates air from oil upon entry of the hot oil via the oil manifold 62 in the oil-receiving cavity of the oil reservoir 31*b*, and the deaerator 38 feeds hot deaerated oil into the oil reservoir 31*b*. More particularly, the deaerator 38 rotates and spills hot deaerated oil on a larger portion of the sidewall 54*b* and on several fins 64 upon rotation thereof. Since the hot deaerated oil is projected on a larger portion of the sidewall 54*b* and on several fins 64 simultaneously, heat transfer between the oil and the cooling fluid 42 is increased as the hot oil is in contact with more surface area of the sidewall 54*b* and fins 64. The deaerated oil then flows from an upper fin 64 to a lower fin 64 and on the sidewall 54*b* in a cascading motion, as depicted by arrows 65, until reaching the liquid oil at the bottom of the oil reservoir 31*b*. It is also contemplated that the deaerator 38 could be static in other implementations.

Referring now to FIG. 5, an oil distribution system 230 is shown. For simplicity, the oil distribution system 230 has same or similar features and structures as the oil distribution system 30, and these features and structures are identified with the same reference numeral, for simplicity. The heat exchanger 40 disposed in the system container 31*a* has an intermediate wall 54*c* located between the top wall 50*a* of the system container 31*a* and the top wall of the oil reservoir 31*b*, between the bottom wall 52*a* of the system container 31*a* and the bottom wall 52*b* of the oil reservoir 31*b*, and between the sidewall 54*a* of the system container 31*a* and the sidewall 54*b* of the oil reservoir 31*b*. An oil inlet 62*a* is defined in the intermediate wall 54*c* and allows hot oil to flow in an oil passage 62*b* located between the sidewall 54*b* and the intermediate wall 54*c*. An oil outlet 62*c* is defined in the oil reservoir 31*c*, and is fluidly connected to the oil passage 62*b*. The cooling fluid inlet 56 is defined in the sidewall 54*a* of the system container 31*a*, and is fluidly connected to the cooling fluid passage 48 located between intermediate wall 54*c* and the sidewall 54*a*. The matrix 66 is disposed between the intermediate wall 54*c* and the sidewall 54*a*. The matrix 66 is connected or integrally formed with the intermediate wall 54*c* and/or the sidewall 54*a*, in order to allow heat transfer using thermal conductivity.

In operation, hot oil flows upwardly in the oil passage 62*b* between the oil inlet 62*a* and the oil outlet 62*c*, as depicted by arrows 265. As hot oil flows in the oil passage 62*b*, the oil contacts the intermediate wall 54*c* being cooled by the matrix 66 and the cooling fluid 42 flowing between the cooling fluid inlet 56 and the cooling fluid outlet 60. It is noted in this implementation that both the oil and the cooling fluid 42 flow upwardly, as depicted by arrows 265, 270. When the cooled oil has reached the oil outlet 62*c*, the cooled oil enters the oil reservoir 31*b*. Although not depicted in the FIGS., the oil reservoir 31*b* could include a plurality of fins 64 extending therein for increased heat transfer.

Referring now to FIG. 6, another oil distribution system 330 is shown. For simplicity, the oil distribution system 330 has same or similar features and structures as the oil distribution system 230, and these features and structures are identified with the same reference numeral, for simplicity. In the implementation shown, the oil passage 62*b* is located between the sidewall 54*a* and the intermediate wall 54*c*, and the cooling fluid passage 48 is located between the sidewall 54*b* and the intermediate wall 54*c*. The oil inlet 62*a* is defined in the bottom wall 52*a* and the oil outlet 62*c* is defined in the top wall 50*b* of the oil reservoir 31*b*. The cooling fluid inlet 56 is defined in the intermediate wall 54*c*, and is fluidly connected to the cooling fluid passage 48 located between intermediate wall 54*c* and the sidewall 54*b*. The matrix 66 is connected to or formed integrally with the intermediate wall 54*c*. The matrix 66 extends laterally between the sidewalls 54*a*, 54*b*. Put differently, the matrix 66 extends in both the cooling fluid passage 48 and in the oil passage 62*b*.

In operation, hot oil flows upwardly in the oil passage 62*b* between the oil inlet 62*a* and the oil outlet 62*c*, as depicted by arrows 365. As hot oil flows in the oil passage 62*b*, the oil contacts the intermediate wall 54*c* and the matrix 66. The cooling fluid 42 also flows upwardly in the cooling fluid passage 48 and contacts the matrix 66. It is noted in this implementation that both the oil and the cooling fluid 42 flow upwardly along the sidewalls 54*a*, 54*b* in their respective passages 62b, 48, as depicted by arrows 365, 370. Heat is transferred from the oil to the cooling fluid 42 upon contact thereof with the intermediate wall 54c and the matrix 66. When the cooled oil has reached the oil outlet 62c, the cooled oil enters the oil reservoir 31b.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the direction of flow of the oil and cooling fluid could vary in other implementations. Yet further modifications could be implemented by a person of ordinary skill in the art in view of the present disclosure, which modifications would be within the scope of the present technology.

The invention claimed is:

1. An aircraft engine oil distribution system, comprising:
a system container having one or more walls enclosing an internal volume;
an oil reservoir disposed in the internal volume of the system container and defining an oil-receiving cavity therein for storing liquid oil and a mist of air and oil, the oil reservoir having an oil inlet defined through a wall of the oil reservoir, the oil reservoir having a plurality of fins protruding from an inner surface of the wall and extending into the oil-receiving cavity, the plurality of fins disposed below the oil inlet relative to gravity, the plurality of fins extending from bases to tips, the tips being spaced apart from the inner surface of the wall, the plurality of fins extending peripherally around the oil-receiving cavity in a direction being transverse to an oil flow flowing downwardly from the oil inlet towards a bottom of the oil-receiving cavity; and
a heat exchanger disposed in the internal volume of the system s, the heat exchanger including:
a cooling fluid passage extending between a cooling fluid inlet and a cooling fluid outlet, the cooling fluid passage defined between the one or more walls of the system container and the wall of the oil reservoir and permitting flow of a cooling fluid therein; and
a matrix disposed in the cooling fluid passage in heat transfer relationship with the plurality of fins of the oil reservoir.

2. The aircraft engine oil distribution system of claim 1, wherein the cooling fluid passage is defined between a bottom wall of the system container and a bottom wall of the oil reservoir, between a sidewall of the system container and the wall of the oil reservoir, and between a top wall of the system container and a top wall of the oil reservoir.

3. The aircraft engine oil distribution system of claim 2, wherein the cooling fluid inlet is located closer to the bottom wall of the system container than the top wall of the system container, and the cooling fluid flows upwardly in the cooling fluid passage.

4. The aircraft engine oil distribution system of claim 1, further comprising an oil manifold located above the plurality of fins and allowing hot oil to cascade downwardly over the plurality of fins.

5. The aircraft engine oil distribution system of claim 4, wherein the cooling fluid flows through the cooling fluid passage in a direction opposite a flow of oil over the plurality of fins within the oil reservoir.

6. The aircraft engine oil distribution system of claim 1, wherein the bases of the plurality of fins are located into the cooling fluid passage, the fins being connected to the matrix of the heat exchanger and protruding from the matrix and through the wall of the oil reservoir for transferring heat from the oil located in the oil reservoir to the matrix by thermal conduction.

7. The aircraft engine oil distribution system of claim 1, wherein the plurality of fins are scoop-shaped and configured for permitting the oil from dripping from a first fin to a second fin located below the first fin.

8. The aircraft engine oil distribution system of claim 1, wherein the matrix includes at least one of microchannels, a lattice structure, and gyroid structures.

9. The aircraft engine oil distribution system of claim 1, further comprising a deaerator for separating air from oil upon entry in the oil reservoir and to feed hot deaerated oil into the oil reservoir.

10. The aircraft engine oil distribution system of claim 9, wherein the deaerator is rotating and spills hot deaerated oil on the wall of the oil reservoir and the plurality of fins upon rotation thereof.

11. The aircraft engine oil distribution system of claim 1, wherein the cooling fluid is selected from a group comprising liquid ammonia, liquid methane, liquid propane, liquid butane, supercritical carbon dioxide, and liquid hydrogen.

12. The aircraft engine oil distribution system of claim 11, wherein the cooling fluid is configured for use in a turbo-expander.

13. An aircraft engine oil distribution system, comprising:
a system container having one or more walls enclosing an internal volume;
an oil reservoir disposed in the internal volume of the system container for storing liquid oil and a mist of air and oil, the oil reservoir having one or more walls; and
a heat exchanger disposed in the internal volume of the system container, the heat exchanger including:
an intermediate wall extending between the one or more walls of the oil reservoir and the one or more walls of the system container;
an oil passage fluidly connected between an oil inlet and an oil outlet, the oil passage defined between one of the one or more walls of the system container and the one or more walls of the oil reservoir, and the intermediate wall, the oil inlet fluidly connectable to a source of oil and the oil outlet leading to the oil reservoir, an oil flow flowing along a flow path extending from the source of oil, to the oil passage, and in the oil reservoir, the oil passage having two sections each extending along a respective portion of a periphery of the oil reservoir, the flow path dividing in two flow paths downstream of the oil inlet and both converging towards the oil outlet;
a cooling fluid passage fluidly connected between a cooling fluid inlet and a cooling fluid outlet, the cooling fluid passage defined between another one of the one or more walls of the system container and the one or more walls of the oil reservoir, and the intermediate wall; and
a matrix disposed in the cooling fluid passage in heat transfer relationship with the intermediate wall, the matrix defining a plurality of fluid passages fluidly connected to the cooling fluid passage, the plurality of fluid passages defined by one or more of microchannels, a lattice structure, and gyroid structures.

14. The aircraft engine oil distribution system of claim 13, wherein:
the oil passage is defined between the one or more walls of the oil reservoir and the intermediate wall;

the cooling fluid passage is defined between the intermediate wall and the one or more walls of the system container; and the matrix is disposed between the intermediate wall and the one or more walls of the system container.

15. The aircraft engine oil distribution system of claim 14, wherein a cooling fluid flows in a same direction as the oil in the cooling fluid passage between the cooling fluid inlet and the cooling fluid outlet.

16. The aircraft engine oil distribution system of claim 14, wherein the oil flows upwardly between the oil inlet and the oil outlet.

17. The aircraft engine oil distribution system of claim 13, wherein:

the oil passage is defined between the one or more walls of the system container and the intermediate wall;

the cooling fluid passage is defined between the intermediate wall and the one or more walls of the oil reservoir; and the matrix is connected to the intermediate wall and further extends in the oil passage.

18. The aircraft engine oil distribution system of claim 17, wherein the cooling fluid flows between the cooling fluid inlet and the cooling fluid outlet in the cooling fluid passage in a same direction as the oil flows in the oil passage.

19. The aircraft engine oil distribution system of claim 17, wherein the oil flows upwardly in the oil passage.

20. The aircraft engine oil distribution system of claim 13, wherein the cooling fluid is selected from a group comprising liquid ammonia, liquid methane, liquid propane, liquid butane, supercritical carbon dioxide, and liquid hydrogen.

\* \* \* \* \*